(12) United States Patent
Gelfenbeyn et al.

(10) Patent No.: US 10,990,377 B2
(45) Date of Patent: *Apr. 27, 2021

(54) ONLINE MARKETPLACE OF PLUGINS FOR ENHANCING DIALOG SYSTEMS

(71) Applicant: Google LLC, Mountain View, CA (US)

(72) Inventors: Ilya Gennadyevich Gelfenbeyn, Sunnyvale, CA (US); Artem Goncharuk, Mountain View, CA (US); Pavel Aleksandrovich Sirotin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,469

(22) Filed: Jun. 17, 2019

(65) Prior Publication Data

US 2019/0369982 A1    Dec. 5, 2019

Related U.S. Application Data

(63) Continuation of application No. 15/166,292, filed on May 27, 2016, now Pat. No. 10,324,704.

(Continued)

(51) Int. Cl.
*G06F 8/65* (2018.01)
*H04L 29/06* (2006.01)
(Continued)

(52) U.S. Cl.
CPC .................. *G06F 8/65* (2013.01); *G06F 8/61* (2013.01); *G06Q 20/123* (2013.01);
(Continued)

(58) Field of Classification Search
CPC .......... G06F 9/44526; G06F 8/61; G06F 8/65; G06Q 20/123; H04L 63/102
See application file for complete search history.

(56) References Cited

U.S. PATENT DOCUMENTS 7,861,167 B2 * 12/2010 Fernando .................. G06F 9/46
715/700
8,261,231 B1 * 9/2012 Hirsch ...................... G06F 8/20
709/201

(Continued)

FOREIGN PATENT DOCUMENTS

CN     101968740     2/2011
CN     102170439     8/2011

(Continued)

OTHER PUBLICATIONS

Search Query Report from IP.com (performed Jun. 8, 2020).*

(Continued)

*Primary Examiner* — Sharon S Lynch
(74) *Attorney, Agent, or Firm* — Middleton Reutlinger

(57) ABSTRACT

A method for enhancing dialog systems is disclosed herein. The method comprises maintaining an online marketplace that may include a plurality of dialog system extension elements. Each of the plurality of dialog system extension elements may include at least one of a dialog system plugin, a dialog system add-on, a dialog system update, and a dialog system upgrade. The method may further include receiving a selection of one of the plurality of dialog system extension elements from a software developer. The software developer may be associated with a dialog system. The method may continue with associating the one of the plurality of dialog system extension elements with the dialog system of the software developer.

20 Claims, 6 Drawing Sheets

Related U.S. Application Data

(60) Provisional application No. 62/166,683, filed on May 27, 2015.

(51) Int. Cl.
  *G06Q 20/12* (2012.01)
  *G06F 8/61* (2018.01)
  *H04M 3/42* (2006.01)
  *H04M 3/537* (2006.01)
  *H04M 7/00* (2006.01)
  *G06F 9/445* (2018.01)
  *G10L 15/22* (2006.01)

(52) U.S. Cl.
  CPC ........ *H04L 63/102* (2013.01); *H04M 3/4217* (2013.01); *H04M 3/537* (2013.01); *H04M 7/0012* (2013.01); *G06F 9/44526* (2013.01); *G10L 15/22* (2013.01)

(56) References Cited

U.S. PATENT DOCUMENTS

| | | | | |
|---|---|---|---|---|
| 8,370,906 | B2* | 2/2013 | Wen | H04L 63/08 726/4 |
| 9,100,386 | B2* | 8/2015 | Wen | H04L 63/08 |
| 2003/0083882 | A1* | 5/2003 | Schemers, III | H04M 3/4938 704/270.1 |
| 2004/0034860 | A1* | 2/2004 | Fernando | G06F 9/46 719/315 |
| 2005/0021689 | A1 | 1/2005 | Marvin et al. | |
| 2005/0091057 | A1 | 4/2005 | Phillips et al. | |
| 2006/0129979 | A1* | 6/2006 | Fernando | G06F 9/46 717/113 |
| 2006/0242077 | A1* | 10/2006 | Dettinger | G06F 21/12 705/59 |
| 2007/0005717 | A1* | 1/2007 | LeVasseur | H04L 63/306 709/206 |
| 2007/0113101 | A1* | 5/2007 | LeVasseur | H04L 51/34 713/189 |
| 2007/0180444 | A1* | 8/2007 | Hoover | G06F 9/44505 717/168 |
| 2007/0201655 | A1* | 8/2007 | Shenfield | H04L 67/34 379/201.01 |
| 2007/0233782 | A1* | 10/2007 | Tali | G06F 8/61 709/203 |
| 2008/0139134 | A1 | 6/2008 | Usuda et al. | |
| 2008/0139314 | A1* | 6/2008 | Yates | G06Q 30/02 463/40 |
| 2008/0201701 | A1* | 8/2008 | Hofhansl | G06F 8/61 717/168 |
| 2008/0301669 | A1* | 12/2008 | Rao | G06F 8/65 717/173 |
| 2009/0037287 | A1* | 2/2009 | Baitalmal | G06F 21/105 705/27.1 |
| 2009/0037337 | A1* | 2/2009 | Baitalmal | G06Q 99/00 705/59 |
| 2009/0210702 | A1* | 8/2009 | Welingkar | H04L 9/321 713/156 |
| 2010/0037204 | A1* | 2/2010 | Lin | G06Q 30/0267 717/106 |
| 2010/0262956 | A1 | 10/2010 | Okada | |
| 2010/0306689 | A1* | 12/2010 | Jarvenpaa | H04L 67/34 715/772 |
| 2011/0023092 | A1* | 1/2011 | Wen | G06F 21/51 726/4 |
| 2011/0113109 | A1* | 5/2011 | LeVasseur | H04L 51/12 709/206 |
| 2011/0154302 | A1 | 6/2011 | Balko et al. | |
| 2011/0302623 | A1* | 12/2011 | Ricci | G06F 21/105 726/1 |
| 2011/0321008 | A1 | 12/2011 | Jhohey et al. | |
| 2012/0185821 | A1* | 7/2012 | Yaseen | G06F 8/35 717/105 |
| 2012/0198017 | A1* | 8/2012 | LeVasseur | H04L 63/168 709/206 |
| 2013/0111565 | A1* | 5/2013 | Wen | H04L 63/08 726/4 |
| 2013/0124700 | A1* | 5/2013 | Miller | G06F 9/44526 709/220 |
| 2013/0185362 | A1 | 7/2013 | Clagg et al. | |
| 2013/0191823 | A1 | 7/2013 | Davidson et al. | |
| 2013/0247030 | A1* | 9/2013 | Kay | G06F 8/60 717/178 |
| 2014/0047413 | A1* | 2/2014 | Sheive | G06F 8/30 717/110 |
| 2014/0053126 | A1* | 2/2014 | Watson | G06F 8/70 717/102 |
| 2014/0109073 | A1* | 4/2014 | Fawcett | G06F 8/65 717/168 |
| 2014/0115084 | A1* | 4/2014 | LeVasseur | H04L 51/12 709/206 |
| 2014/0122883 | A1* | 5/2014 | LeVasseur | H04L 9/3213 713/170 |
| 2014/0129303 | A1 | 5/2014 | Aiglstorfer | |
| 2014/0298443 | A1* | 10/2014 | Amaro | H04L 63/08 726/9 |
| 2014/0310606 | A1* | 10/2014 | Liu | G06Q 10/107 715/738 |
| 2014/0337148 | A1* | 11/2014 | Kannan | G06Q 30/02 705/14.73 |
| 2015/0033217 | A1* | 1/2015 | Mellor | G06F 21/604 717/171 |
| 2015/0058831 | A1 | 2/2015 | Warren | |
| 2015/0135160 | A1* | 5/2015 | Gauvin | G06F 8/71 717/109 |
| 2015/0186123 | A1* | 7/2015 | Piunno | G06Q 30/00 717/163 |
| 2016/0142364 | A1* | 5/2016 | LeVasseur | H04L 51/00 709/206 |
| 2016/0259767 | A1* | 9/2016 | Gelfenbeyn | G06F 40/35 |
| 2016/0261536 | A1* | 9/2016 | LeVasseur | H04L 63/12 |
| 2017/0185582 | A1* | 6/2017 | Gelfenbeyn | H04M 3/4936 |
| 2017/0193234 | A1* | 7/2017 | LeVasseur | H04L 9/3213 |
| 2017/0235559 | A1* | 8/2017 | Saenz | G06F 8/65 717/171 |
| 2018/0054414 | A1* | 2/2018 | LeVasseur | G06F 21/606 |
| 2018/0270187 | A1* | 9/2018 | LeVasseur | H04L 51/22 |
| 2018/0367496 | A1* | 12/2018 | LeVasseur | H04L 9/3263 |
| 2019/0238493 | A1* | 8/2019 | LeVasseur | H04L 51/14 |
| 2019/0238494 | A1* | 8/2019 | LeVasseur | H04L 63/306 |
| 2020/0045519 | A1* | 2/2020 | Raleigh | G06F 3/0482 |

FOREIGN PATENT DOCUMENTS

| | | |
|---|---|---|
| CN | 102843334 | 12/2012 |
| CN | 103034928 | 4/2013 |
| CN | 103631579 | 3/2014 |
| CN | 104580342 | 4/2015 |
| EP | 2685376 | 1/2014 |
| WO | 2008042984 | 4/2008 |
| WO | 2014178901 | 11/2014 |

OTHER PUBLICATIONS

Search Query Report from IP.com (performed Dec. 9, 2020) (Year: 2020).*

China National Intellectual Property Administration; Notification of First Office Action issue in Application No. 201680018569.8; 46 pages; dated Mar. 27, 2020.

European Patent Office, Extended European Search Report of EP Application No. 16800765.6; 8 pages; dated Nov. 26, 2018.

International Search Report and Written Opinion of Ser. No. PCT/US2016/034504; 9 pages; dated Aug. 31, 2016.

15166292 STIC Search Strategy (Requested Jul. 23, 2018).

India Intellectual Property; Examination Report issue in Application No. 201747044786; 6 pages; dated Aug. 24, 2020.

China National Intellectual Property Administration; Notification of Notice of Allowance issue in Application No. 201680018569.8; 7 pages; dated Sep. 28, 2020.

(56) References Cited

OTHER PUBLICATIONS

European Patent Office; Communication Pursuant to Article 94(3) EPC issue in Application No. 16800765.6; 7 pages; dated Jan. 27, 2021.

* cited by examiner

ONLINE MARKETPLACE OF PLUGINS FOR ENHANCING DIALOG SYSTEMS

TECHNICAL FIELD

This disclosure relates generally to data processing and more particularly to dialog systems and an online platform allowing application developers to build, customize, and maintain dialog systems for software applications.

BACKGROUND

Currently, dialog systems are widely used in the information technology industry, especially in the form of mobile applications for cell phones and tablet computers. A dialog system can include a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "Dialog System" for simplicity.

Traditionally, a dialog system interacts with its users in natural language to simulate an intelligent conversation and provide personalized assistance to the users. For example, a user may generate requests to the dialog system in the form of conversational questions, such as "What is the weather like in Palo Alto?" and receive corresponding answers from the dialog system in the form of audio and/or displayable messages. The users may also provide voice commands to the dialog system requesting the performance of certain functions including, for example, generating e-mails, making phone calls, searching particular information, acquiring data, navigating, requesting notifications or reminders, and so forth. These and other functionalities make dialog systems very popular as they are of great help, especially for holders of portable electronic devices such as smart phones, cellular phones, tablet computers, gaming consoles, and the like.

Although the demand for dialog systems for third party mobile applications and web services is constantly growing, it is not an easy task to create a well-operating dialog system. Each dialog system has a dialog system interface and dialog system engine. Dialog system interface is responsible for receiving user inputs and delivering dialog system responses to the user. A dialog system engine is responsible for transforming voice user inputs into text inputs, interpreting text inputs, and generating corresponding responses to text inputs. The process running on the dialog system engine is also known as "natural language processing" or NLP. Development of NLP models is not only very time consuming, but is also a highly technical task. Accordingly, most application developers may struggle to develop a Dialog System for integration with a particular mobile application or web service. Accordingly, there is a need in the art to simplify the process of creating, developing and maintaining dialog systems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a system for enhancing dialog systems. The system may include at least one processor and a memory. The memory may be operable to maintain an online marketplace that may comprise a plurality of dialog system extension elements. Each of the plurality of dialog system extension elements may include at least one of a dialog system plugin, a dialog system add-on, a dialog system update, and a dialog system upgrade. The processor may be operable to receive a selection of one of the plurality of dialog system extension elements from a software developer. The software developer may have a dialog system associated with the software developer. The processor may be further operable to associate the one of the plurality of dialog system extension elements selected by the software developer with a dialog system of the software developer.

Provided is a method for enhancing dialog systems. The method may include maintaining an online marketplace that may comprise a plurality of dialog system extension elements. Each of the plurality of dialog system extension elements may include at least one of a dialog system plugin, a dialog system add-on, a dialog system update, and a dialog system upgrade. The method may further include receiving a selection of one of the plurality of dialog system extension elements from a software developer. The software developer may be associated with a dialog system. The method may continue with associating the one of the plurality of dialog system extension elements selected by the software developer with the dialog system of the software developer.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
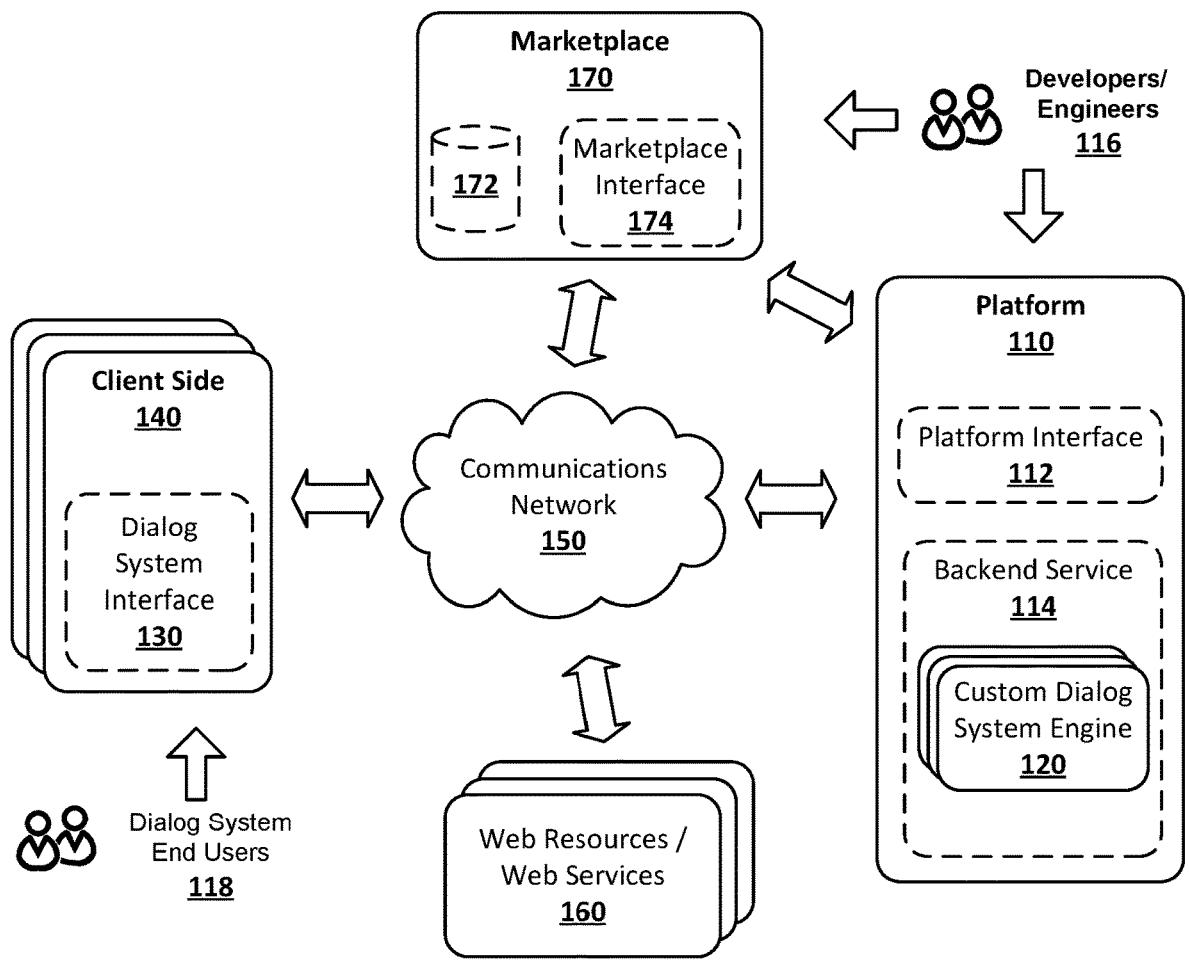
FIG. 1 illustrates an environment within which systems and methods for enhancing dialog systems can be implemented, in accordance with some embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

The terms "application developer" and "software developer" or simply "developer" refer to one or more of the following: a software developer, a mobile application developer, a software engineer, a software owner, a mobile application owner, a software manager, a mobile application manager, a dialog system owner, and the like. Application developers develop and/or manage a Dialog System Engine and/or a Dialog System Interface.

The term "Dialog System" refers to one or more of the following: a chat information system, a spoken dialog system, a conversational agent, a chatter robot, a chatterbot, a chatbot, a chat agent, a digital personal assistant, an automated online assistant, and the like. Each Dialog System includes "Dialog System Interface" and "Dialog System Engine." Each of these elements can be customized by an application developer.

The term "Dialog System Interface" refers to a computer-human interface, which is configured to acquire user inputs in the form of audio messages or text messages, and deliver dialog system responses to the users in the form of audio messages or displayable messages. In an example embodiment, a Dialog System Interface may be implemented as a widget employed to or integrated with a software application, a mobile application, a middleware application, a firmware application, a website, and web service, to provide a computer-human interface for acquiring user requests and delivering dialog system outputs to the users.

The term "Dialog System Engine" refers to a software application, which is configured to process user inputs and generate responses thereto. In one example embodiment, a Dialog System Engine refers to a computer-enabled or processor-enabled system for supporting an associated Dialog System Interface by processing user requests and generating corresponding responses thereto.

The term "plugins" refers to one or more of the following: software plugins, add-ons, software extensions, updates, upgrades or software codes for a Dialog System Engine. The term "plugins" is also referred herein to as "dialog system extension elements."

The present technology provides for a platform enabling creation of custom Dialog System Engines serving as backend services for Dialog System Interfaces. The platform may include an online platform (i.e., a platform that resides on a server or network node). The present technology also provides for an online marketplace, such as one implemented as a website or web service, for a plurality of dialog system extension elements including various plugins, add-ons, extensions, updates, or software codes for custom Dialog System applications and custom Dialog Systems. The online marketplace can be a part of or connected to the platform to enable a software developer to create custom Dialog Systems and enhance the functionality of Dialog Systems maintained by the platform. More particularly, by using the online marketplace, software developers can extend functionalities of dialog systems associated with the software developers by installing plugins available via the online marketplace and integrating these plugins into the dialog systems.

Dialog System Interfaces can be implemented at least as a part of various software applications, mobile applications, middleware applications, firmware applications, websites, web services, and so forth. In other words, Dialog System Interfaces may be on a client side and may provide a computer-human interface configured to at least acquire user inputs and deliver dialog system outputs to the users. Dialog System Engines, on the other hand, support the Dialog System Interfaces by processing user inputs and generating corresponding responses thereto. Thus, the Dialog System Engine and the Dialog System Interface, when interacting with each other, form a Dialog System. One may refer to a Dialog System Interface running on or accessed from a client device as a "frontend" user interface, while a Dialog System Engine, which supports the operation of such Dialog System Interface, can be referred to as a "backend" service.

In general, by selecting or purchasing a particular plugin at the marketplace, application developers may extend functionality of Dialog Systems developed by or belonging to the application developers and ultimately extend or alter functionality of software applications that use the Dialog Systems, as well as implement a particular function or a broad array of functions of the software applications that use the Dialog Systems. Once a plugin is selected or purchased by a developer, the plugin can be automatically integrated with a particular Dialog System Engine maintained by the platform. The plugin may have defined application programming interface signatures. Accordingly, when the Dialog System Interface receives user requests, the user requests may be processed using plugins associated with the Dialog System Engine. In other embodiments, user requests may be processed by internal modules of the Dialog System Engine, and if no "good" fulfillment can be found or no proper response can be generated, the user requests may be processed by the associated plugins. Therefore, this technology allows the application developers to enhance Dialog System functionalities without investing time in developing Dialog Systems having multiple Dialog System rules.

The benefits of methods and system of the present disclosure can be evident from the following example. Assume a software developer needs to create a mobile application, such as a restaurant booking system, which integrates a Dialog System to allow users to make oral requests. The software developer may not have time or resources to create his own Dialog System, and thus the software developer may use an online platform to create a custom Dialog System specifically for his or her mobile application. The mobile application may include only a Dialog System Interface, which can accept user requests and deliver the user requests to the custom Dialog System Engine for processing, as well as receive responses from the custom Dialog System Engine and provide the responses to the users through a displayable or audio message. The custom Dialog System Engine may reside at the online platform (i.e., on a server or network node). Normally, when the custom Dialog System Engine processes a user request, the Dialog System Engine may generate a response to the user request and cause the Dialog System Interface to deliver the response to the user. In order for the Dialog System Engine to operate normally, the software developer may need to create or customize rules (in some embodiments, this task may require creating entities and intents which define dialog structures and fulfillment execution rules). However, this task can be time consuming in certain instances. Moreover, even if the Dialog System Engine is properly trained, there still can be functions that the Dialog System Engine may not able to fulfill. In these cases, the software developer may improve functionality and operability of the Dialog System Engine by installing plugins. The software developer may simply need to open the online marketplace and select one or more certain plugins the software developer wants to add to the Dialog System. For example, there may be a plugin, which includes dialog system rules with certain entities and intents related specifically to online booking systems. Alternatively, there can be a plugin allowing the Dialog System to process user requests in a foreign language. It shall be clear that there can be a number of various plugins for fulfilling different needs. The software developer can select or purchase plugins of interest at the marketplace in order to make the plugins of interest integrated with the particular Dialog System Engine of the software developer. Once the plugin is installed, the plugin can handle user requests or parts of the user requests so as to fulfill particular user needs. The plugins can be created by third party developers and can be purchased or provided on a free-of-charge basis depending on a particular implementation.

Therefore, the present technology makes it very easy and fast for software developers to create custom Dialog Systems for a wide range of third party mobile applications or web services, while adding plugins to these Dialog Systems through the marketplace enhances Dialog System functionality. More specifically, the platform, according to various embodiments of the present disclosure, allows for software developers and engineers to create custom Dialog System Engines that may support frontend Dialog System Interfaces. For example, if a software developer wants to integrate Dialog System functionality into a mobile application as an additional feature, the developer can use the platform to create and deploy a custom Dialog System Engine and link the custom Dialog System Engine with the mobile application. The mobile application, in turn, may have only a Dialog System Interface. In this example, the Dialog System Interface can be activated by a user when the user interacts with the mobile application. The user can make inquiries to the Dialog System Interface in the form of voice inputs or text inputs. Upon receipt of a user inquiry, the Dialog System Interface can transfer the user inquiry with little or no pre-processing to the linked custom Dialog System Engine, which was previously created using the platform. The Dialog System Engine may process the received user inquiry, interpret the user inquiry, and generate a response to the user inquiry based on predetermined rules and settings. The response may then be delivered to the Dialog System Interface for further visual or audio presentation to the user. In some embodiments, the response may include a response text to be delivered to the user and/or metadata with instructions for the user device to perform an action (e.g., open a browser, access certain data online, run a particular application, etc.). In other embodiments, the response may include a callback Uniform Resource Identifier (URI) that the Dialog System Interface or user device may need to access to obtain a response text and/or metadata or perform an action on the device/app represented by the URI.

In general, Dialog System Interfaces can be integrated or be an integral part of a wide range of software applications running on a client device, such as a personal computer (PC) or a cellular phone, or on a server so that the Dialog Systems become a part of a website or web service. Dialog Systems can be implemented on a server such that their functionalities can be accessible to Dialog System Interfaces over the Internet, cellular networks, or any other communications means. An online marketplace can be also implemented in "a cloud," meaning it can run on a server and be available to software developers thorough a particular website or web interface.

Referring now to the drawings, FIG. 1 shows a high-level block diagram of example system environment 100 suitable for practicing the present technologies. As shown on FIG. 1, there is a platform 110 for creating and maintaining custom Dialog Systems Engines. To these ends, the platform 110 may include a platform interface 112 for creating custom Dialog System Engines and backend service 114 for maintaining and running custom Dialog System Engines 120.

The platform interface 112 may include a graphical user interface (GUI) embedded into a webpage and accessible by developers and/or engineers 116 via the Internet. In some other embodiments, however, the platform interface 112 may be implemented as a software application such as a downloadable software application or any other software, middleware, or firmware running on or accessible from an electronic device such as a computer. In the example shown in FIG. 1, the platform interface 112 may be realized as a web accessible GUI as will be described below. For simplicity, this disclosure describes such embodiments where the platform interface 112 is a server-based solution so that it is accessible via the Internet. Regardless of a particular implementation, the platform interface 112 may enable the developers and/or engineers 116 through a number of GUI tools to create one or more custom Dialog System Engines 120.

Still referencing to FIG. 1, the backend service 114 of the platform 110 may be responsible for maintaining and running the custom Dialog System Engines 120 that are created, for example, by or with the help of the platform interface 112. The backend service 114 may operate as a web service providing functionality to custom Dialog Systems by enabling Dialog System Interfaces 130 to interact with the custom Dialog System Engines 120 maintained at the backend service 114 of the platform 110.

As briefly discussed above, the Dialog System Interfaces 130 can be provided on a client side 140 associated with dialog system end users 118. The Dialog System Interfaces 130 may be as simple as a GUI enabling the dialog system end users 118 to make inquiries, which may be then delivered to the backend service 114 for processing by the corresponding Dialog System Engines 120, and to receive responses to the inquires generated by Dialog System Engines 120. The Dialog System Interfaces 130 may be implemented as a stand-alone software application or the Dialog System Interfaces 130 can be an integral part of a software application, mobile application, web service, website, and the like.

Still referencing to FIG. 1, the client side 140 may refer to, but is not limited to, a user device, a terminal, a computing device (e.g., a laptop computer, a tablet computer, a desktop computer, a PC), a cellular phone, a smart phone, a gaming console, a remote control, a multimedia system, a smart television device, a set-top box, an infotainment system, an in-vehicle computing device, an informational kiosk, a robot, and so forth. In these embodiments, the Dialog System Interfaces 130 may be implemented as software, middleware, or firmware installed on such devices.

In additional embodiments, the client side 140 may refer to a networked or online solution, such as a server, hosting service, web service, web site, cloud service, and so forth. For example, the Dialog System Interface 130 can be a widget or a GUI provided on one or more web pages enabling end users to make inquiries and get responses to the inquiries. This option may be suitable for those instances when a developer, for example, wants to integrate a Dialog System into a website of the developer to provide enhanced customer service.

As can be seen in FIG. 1, the interaction between the Dialog System Interfaces 130 and the corresponding Dialog System Engines 120 may be performed via a communications network 150. The communications network 150 may include one or more of the Internet, intranet, cellular network, Local Area Network (LAN), Wide Area Network (WAN), IEEE 802.11 based network, and so forth.

FIG. 1 also shows various third party web resources/web services 160 provided via one or more web servers. These third party web resources/web services 160 can provide information of various types to the Dialog System Engines 120 or the Dialog System Interfaces 130 as a part of a response to a user request. For example, the web resources/web services 160 may refer to email services, weather services, navigation services, and the like. Accordingly, if a user makes the inquiry "What is the weather like today?," such information may be automatically acquired by the Dialog System Engine 120 from one or more third party web resources/web services 160 and then integrated into a dialog system response to be delivered to the dialog system end users 118.

Still referring to FIG. 1, the example system environment 100 may include an online plugin marketplace, shown as a marketplace 170, for maintaining a plurality of plugins. The marketplace 170 can be implemented on a server such that it can communicate with the platform 110. In some embodiments, however, the marketplace 170 can be integrated with the platform 110.

The marketplace 170 may include a database 172 for storing plugins and respective metadata. The marketplace 170 may also include a marketplace interface 174 for enabling the software developers to review, select, purchase, and/or optionally customize selectable plugins. Metadata may accompany each plugin and include content associated therewith. For example, metadata may include one or more of the following: a description of plugins, example images, example audio messages, tags, developer comments, ranks, publisher information, payment information, statistical information (e.g., a number of downloads/installs), abuse report links/buttons, legal notices, hyperlinks to third party web resources, and so forth.

The marketplace interface 174 may include a GUI embedded into a webpage and accessible by the developers via the Internet. In some other embodiments, however, the marketplace interface 174 may be implemented as a software application such as a downloadable software application or any other software, middleware, or firmware running on or accessible from an electronic device such as a computer. In the example shown in FIG. 1, the marketplace interface 174 may be realized as a web accessible GUI. For simplicity, this disclosure describes such embodiments where the marketplace 170 is a server based solution so that it is accessible via the Internet. Regardless of a particular implementation, the marketplace interface 174 enables the developers, through a number of GUI tools, to select one or more plugins and associate them with their custom Dialog System Engines 120.

As mentioned above, plugins can be provided to software developers when purchased or on a free-of-charge basis. In an example embodiment, the application developers may need to make a one-time payment or subscribe to a plan requiring regular payments. Accordingly, the marketplace 170 may be enabled to make financial transactions using monetary or non-monetary funds. For example, the marketplace 170 may have a credit card processing agent, an Automated Clearing House agent, and the like. Subscription plans may require payments in amounts depending on a number of dialog system users, period during which a plugin is used (e.g., a periodic plan, such as a month-to-month subscription plan, a yearly plan), number of plugin copies, complexity, number of functions provided by the plugin, and so forth.

Some plugins may be provided free of charge. In one example, plugins can be provided free of charge during a predetermined period (e.g., a test period of one month), but then may require a payment. In another example embodiment, plugins can relate to free of charge open source agents. These free of charge open source agents can be collectively developed by a plurality of developers.

It should be noted that plugins can be provided by software developers or third party developers. For example, some plugins can be provided by an owner of the platform 110 and/or an owner of the marketplace 170. In another example embodiment, plugins can be provided to the marketplace 170 by third party developers or companies. In yet another example embodiment, plugins can be provided to the marketplace 170 by software developers. If plugins are sold from marketplace 170, the original owner of the plugins may be compensated by the marketplace 170 from the funds collected from purchasers. For instance, the owners of plugins sold can be compensated as a percentage of the funds collected at the purchase.

According to some example embodiments, plugins can be shared among software developers. There may be several possible scenarios, including "knowledge sharing" and "black box sharing." Under the "knowledge sharing" concept (also referred herein to as "white box" sharing), plugins may be shared by transferring definitions of entities and intents from one developer to another. This may be similar to sharing source code among developers so that all of the developers can contribute to a particular plugin. Under the "black box sharing" concept, developers on the consuming side may not have access to data, contents, entities, intents, and the like, and can use the plugin at runtime but not make any changes to the plugin.

In order for software developers, third-party developers, or companies (collectively referred to as "plugin developers") to sell and/or share plugins through the marketplace 170, they may be required to register with the marketplace 170 and establish a user profile. In some embodiments, marketplace personnel may review each plugin submitted by a plugin developer before publishing. The review may be required to maintain high quality products and services for application developers. In yet more embodiments, plugin developers may be provided with a separate interface (different from the marketplace interface 174), which may include statistical information associated with plugins of these developers, control modules, financial information, and so forth.

Accordingly, the marketplace 170 can be referred to a multi-user web platform/web service allowing plugin developers to sell, distribute or share plugins or elements of the plugins, and allowing application developers to review, select, or purchase plugins of their interest, and integrate them with custom Dialog System Engines.

The process of creating and operating custom Dialog System Engines 120 will now be described with reference to FIGS. 1-3. In particular, the platform interface 112 may provide one or more GUIs having a number of tools enabling developers to create and customize one or more dialog system elements, which serve as a basis for a custom Dialog System Engine 120.

According to various embodiments, dialog system elements include entities and intents. Each entity may refer to a number of objects having the same or similar characteristics. In other words, entities may include lists of terms and/or keywords defining objects of one class. In one example embodiment, an entity may refer to a keyword and a set of its synonyms. In another example embodiment, an entity may refer to a keyword and a set of its definitions. In yet another example embodiment, an entity may refer to a list (e.g., a list of cities, list of names, list of titles, list of brands, list of street names, etc.).

In some embodiments, each entity can have a title. For example, one entity can be titled as "city" and may contain a list of cities such as Alexandria, Arlington, Boston, and so forth. In other embodiments, an entity can be titled as a keyword and can contain synonyms and/or definitions of this keyword. In one example embodiment, the entity called "music" may include the terms song, singer, singing, musician, and so forth. In another example embodiment, the entity called "artist" may include a list of music bands, music ensembles, or music artists. In another example embodiment, the entity called "Beatles" may include a list of possible synonyms, such as "The Beatles," "Beatles," "Fab Four," "Liverpool Legends," "John Lennon," and so forth. In yet another example embodiment, there can be an entity called "Artist" which may include various artist names, artist name synonyms, music band names, and so forth.

In some embodiments, the Dialog System Engines may include a number of default, pre-configured entities and/or intents. These can include common types of entities or intents related to such concepts as time, date, location, and the like. For example, when a developer creates a new Dialog System Engine, it may already have a few entities of common type such as "@System.Date" entity. This entity may cover linguistic constructs related to particular dates and may include the following terms: "today," "tomorrow," "next week," "January 1," "January 1 of next year," "next Monday," "the following Monday," and so forth.

Further, each intent of a Dialog System Rule may include a dialog system interaction scheme, which may provide a particular relation between at least one user request and at least one dialog system linguistic response or fulfillment response. The dialog system interaction scheme can be represented by a rule based on a relationship between a particular action and at least one entity. Actions generally relate to formalized software objects such as JSON (JavaScript Object Notation) objects causing at least one processor to generate linguistic or fulfillment responses associated with at least one entity. Accordingly, each intent can be represented as a logical relation between at least one action and at least one entity object, for example, as follows:

a) [Action] @[Entity]
b) [Action] @[Entities]
c) [Actions] Ω[Entity]
d) [Actions] @[Entities]
e) Text @[Entity]
f) Text @[Entities]
g) Text @[Entity] Text
h) [Action] Text @[Entity]

The procedures a) through d) mean that a particular Action or several Actions shall be performed by client side 140 and/or Dialog System Interface 130 with respect to a predetermined Entity or several Entities. For example, one intent may be represented as "Play @Artist," where @Artist is a developer-defined entity containing a set of artists. In this example, the intent orders the Dialog System Engine 120 to activate the playback of at least one Beatles song, depending on a context.

The procedures e) through h) mean that particular information in the form of text is provided with respect to a particular Entity. For example, the user request "Create a meeting with John at 1 p.m. tomorrow, please" may be presented as the following markup: [Action] Text @[sys.date-time] Text. Here, @[sys.date-time] refers to an entity associated with time and date, while the phrase "Create a meeting" refers to a predetermined action to be performed by a Dialog System Interface 130 or Dialog System Engine 120 with a certain mobile application, software application, or web service. The element "Text" refers to content and not entity nor intent.

As mentioned above, a dialog system rule may cause generation of linguistic response and/or fulfillment response as an answer to a user request. One example of linguistic response may include particularized content deliverable as an audio message or displayable message. Fulfillment responses may refer to particular processor-executable instructions for one or more software applications, middleware, firmware, web services, and the like that cause implementation of a particular action. Some examples of fulfillment responses may include scheduling an event in a calendar mobile application, writing and sending a text message or email, searching for content at a web search service, building a route in a navigational software application, and so forth. In certain embodiments, at least some linguistic responses and/or fulfillment responses can be configured by developers. In other embodiments, at least some linguistic responses and/or fulfillment responses can be pre-configured and be available as default responses.

In certain additional embodiments, developers can provide not entities and intents, but just example requests to illustrate intents and entities. In these embodiments, the platform 110 may automatically determine, using machine-learning techniques, what entities and intents are implied in example user requests and create corresponding rules. For example, a developer may simply provide example requests, such as "Play Beatles" and "I'd like to listen to Madonna," and the platform 110 may match "Beatles" and "Madonna" to existing entities (system's or user's) and generate corresponding "[Action] @[Entity]" rules automatically.

Thus, developers can use the platform interface 112 to generate a plurality of dialog system rules specific to a particular application or industry. These pluralities of entities and intents form dialog system rules (also referred to as dialog system elements) and enable the custom Dialog System Engines to perform certain actions or generate certain outputs in response to a wide range of end user inputs.

Figure 2:
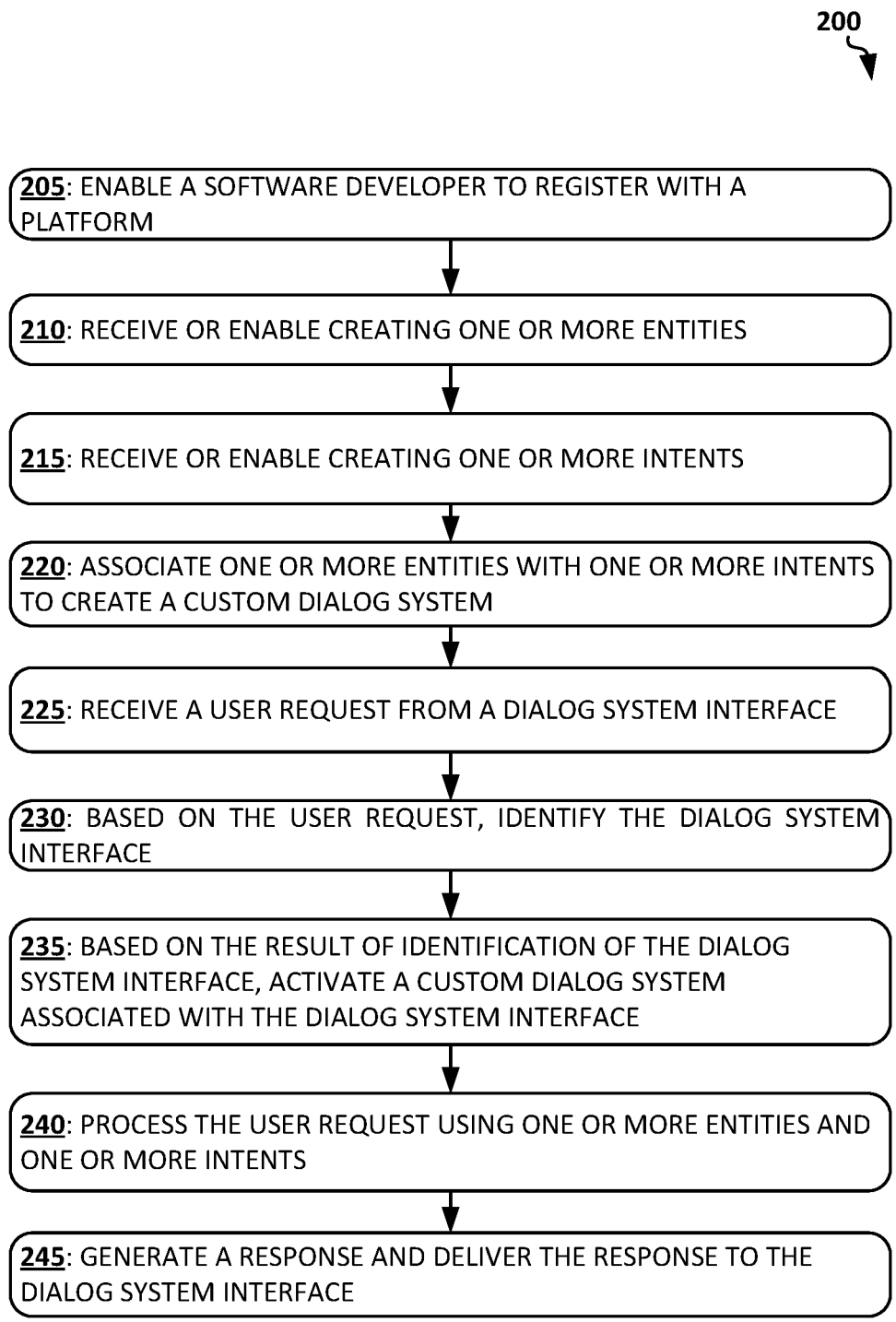
FIG. 2 is a process flow diagram showing a method for creating dialog system engines, in accordance with example embodiments.

FIG. 2 is a process flow diagram showing a method 200 for creating custom Dialog System Engines using a platform, shown as the platform 110 on FIG. 1, and for operating the platform according to an example embodiment. The method 200 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the platform. Notably, the below recited steps of the method 200 may be implemented in an order different than described and shown in FIG. 2. Moreover, the method 200 may have additional steps not shown herein, but which can be evident for those skilled in the art from the present disclosure. The method 200 may also have fewer steps than outlined below and shown in FIG. 2.

At operation 205, an application developer may be enabled to register with the platform. To these ends, the software developer may need to interact with a platform interface. The registration may include creating a developer profile, which can be maintained by the platform. The software developer profile may link (i.e., associate) a custom Dialog System Engine of this software developer and one or more Dialog System Interfaces deployed on a client side. The linking may include stipulating Application Programming Codes, rules for interaction, destination addresses, and so forth.

At operation 210, the platform may receive from the software developer one or more entities and store the received entities at a local database. In some embodiments, the entities may be not received, but created by the developer using web tools of the platform interface.

At operation 215, the platform may receive from the software developer one or more intents and store the intents at the local database. In some embodiments, the intents may be not received, but created by the software developer using tools of the platform interface. As described above, the intents may be associated with the entities, and intents and entities together may form dialog system elements (custom rules enabling the Dialog System Engine to generate responses tailored for specific needs).

At operation 220, the platform may associate one or more entities with one or more intents to create (i.e., form) the custom Dialog System Engine. The custom Dialog System Engine may be associated with one or more Dialog System Interfaces of the software developer.

Operations 205-220 illustrate a set-up process for the custom Dialog System Engine, while the following operations 225-245 illustrate the operation of the custom Dialog System Engine. Once all dialog system elements of custom the Dialog System Engine are created, the dialog system elements may be maintained as a backend service and enable any of the associated Dialog System Interfaces to provide the full functionality of the Dialog System to users according to predetermined settings.

At operation 225, the platform may receive a user request from an unidentified Dialog System Interface. The user request can be a voice input or text input. In some embodiments, the Dialog System Interface can pre-process the user input, for example, by recognizing spoken words and transforming the voice input into text input. In other embodiments, however, no pre-processing is performed by Dialog System Interface.

At operation 230, the platform may process the user request and identify the Dialog System Interface and the Dialog System Engine associated with the identified Dialog System Interface. To these ends, the user request can be accompanied by an identifier when the user request is sent from the Dialog System Interface to the platform.

At operation 235, based on the result of the identification at operation 230, the platform may activate the custom Dialog System Engine associated with the identified Dialog System Interface. At the same operation, the platform may also retrieve or identify one or more dialog system elements (i.e., one or more entities and one or more intents) based on the result of the identification at operation.

At operation 240, the Dialog System Engine may process the user request using identified dialog system elements (i.e., one or more entities and one or more intents) as retrieved at operation 235.

At operation 245, the Dialog System Engine may generate a response and send the response to the Dialog System Interface associated with the custom Dialog System Engine 120. The Dialog System Interface may then display and/or playback the response to the end user depending on predetermined settings.

Figure 3:
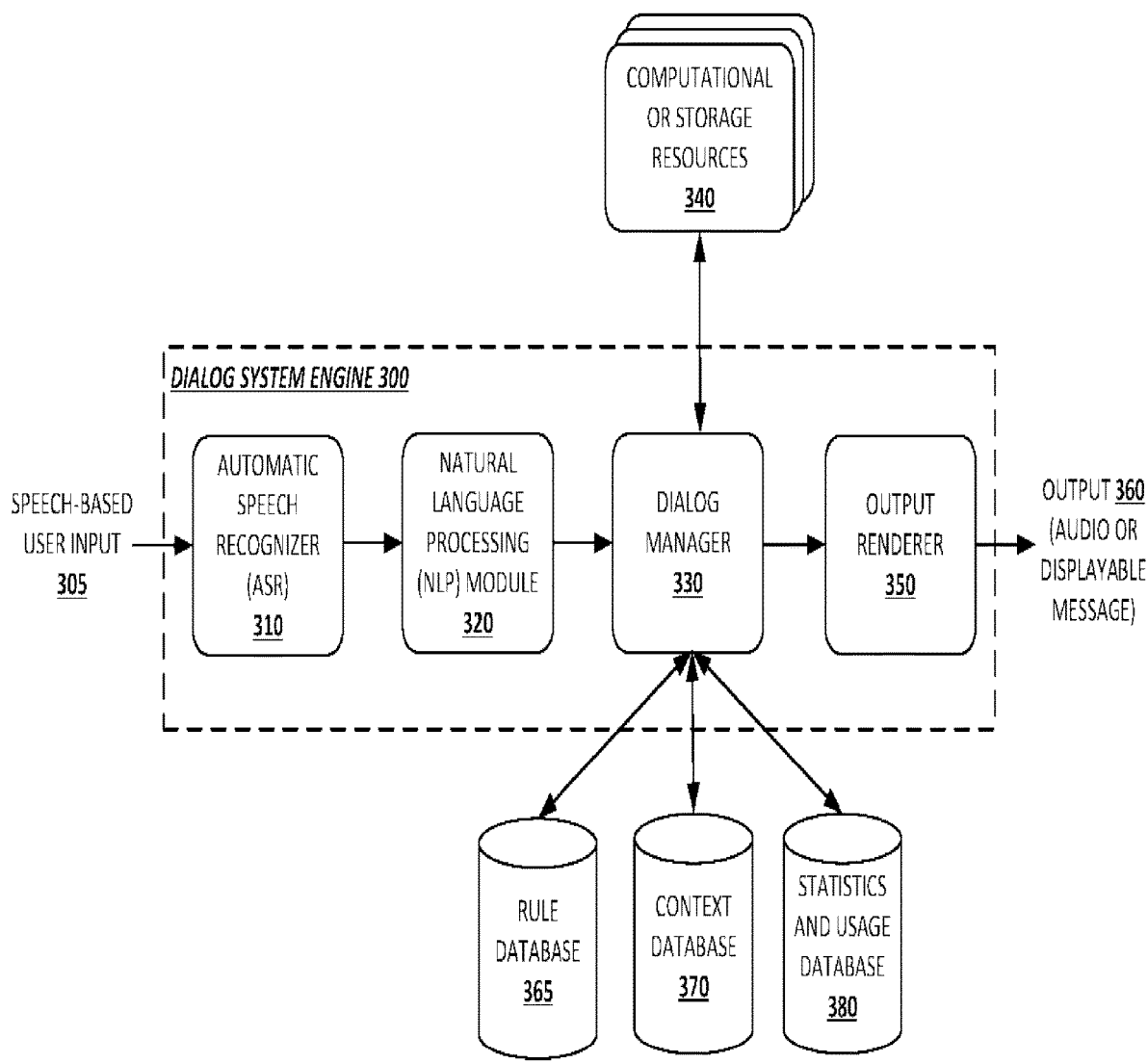
FIG. 3 is a block diagram showing various modules of a dialog system engine, in accordance with example embodiments.

FIG. 3 shows a high-level architecture of an exemplary Dialog System Engine 300, according to an example embodiment. It should be noted that each module of the Dialog System Engine 300 or associated architecture includes hardware components, software components, or a combination thereof. The Dialog System Engine 300 may be embedded or installed in a user device or server, or may be presented as a cloud computing module and/or a distributed computing module.

In the embodiment shown, the Dialog System Engine 300 may include an Automatic Speech Recognizer (ASR) 310 configured to receive and process a speech-based user input 305 into a sequence of parameter vectors. The ASR 310 may further convert the sequence of parameter vectors into a recognized input (i.e., a textual input having one or more words, phrases, or sentences). The ASR 310 may include one or more speech recognizers, such as a pattern-based speech recognizer, free-dictation recognizer, address book based recognizer, dynamically created recognizer, and so forth.

Further, the Dialog System Engine 300 may include an NLP module 320 for understanding spoken language input. Specifically, the NLP module 320 may disassemble and parse the recognized input to produce utterances, which are then analyzed utilizing, for example, morphological analysis, part-of-speech tagging, shallow parsing, and the like. The NLP module 320 may then map recognized input or its parts to meaning representations.

The Dialog System Engine 300 may further include a dialog manager 330, which may coordinate the activity of all components, control dialog flows, and communicate with external applications, devices, services, or resources. The dialog manager 330 may play many roles, which include discourse analysis, knowledge database query, and system action prediction based on the discourse context. In some embodiments, the dialog manager 330 may contact one or more task managers (not shown) that may have knowledge of specific task domains. In some embodiments, the dialog manager 330 may communicate with various computational or storage resources 340, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. In some embodiments, computational or storage resources 340 may include one or more web resources/web services 160 as shown on FIG. 1 and discussed above.

Referring back to FIG. 3, the dialog manager 330 may employ multiple disparate approaches to generate an output 360 in response to recognized inputs. Some approaches include using statistical analysis, machine-learning algorithms (e.g., neural networks), heuristic analysis, and so forth. The dialog manager 330 may be one of the central components of the Dialog System Engine. The major role of the dialog manager 330 may be to select the correct system actions based on observed evidences and inferred dialog states from the results of the NLP (e.g., dialog act, user goal, and discourse history). In addition, the dialog manager 330 may be able to handle errors when the user input has ASR and NLP errors caused by noises or unexpected inputs.

The Dialog System Engine 300 may further include an output renderer 350 for transforming the output 360 of dialog manager 330 into a form suitable for providing to the user. For example, the output renderer 350 may employ a text-to-speech engine or may contact a pre-recorded audio database to generate an audio message corresponding to the output 360 of the dialog manager 330. In certain embodiments, the output renderer 350 may present or cause to present the output 360 of the dialog manager 330 as a text message, an image, or a video message for further displaying on a display screen of the user device. In some example embodiments, the output renderer 350 can constitute at least a part of the Dialog System Interface shown as the Dialog System Interface 130 on FIG. 1.

Still referring to FIG. 3, the Dialog System Engine 300 may include one or more dialog system rules maintained in at least one rule database 365. The Dialog System Engine 300 may also include or be associated with one or more context databases 370, which may maintain a plurality of context description elements, such as lists of terms, keywords, phrases, expressions, context variables, context parameters (e.g., geolocation, system rate, GUI, etc.) associated with one or more dialog system rules. In other words, the context databases 370 may include information supporting the process of determining conversational or environmental context for particular user requests.

The Dialog System Engine 300 may also include or be associated with one or more statistics and usage databases 380, which may be configured to aggregate statistical or usage information associated with the operation of the Dialog System Engine 300 and/or associated Dialog System Interface and/or associated mobile or software application. For example, statistics and usage database 380 may accumulate dialog system logs, which can be later used for optimization of dialog system rules, dialog system responding schemes, training machine-learning algorithms if employed by Dialog System Engine 300, and so forth.

Figure 4:
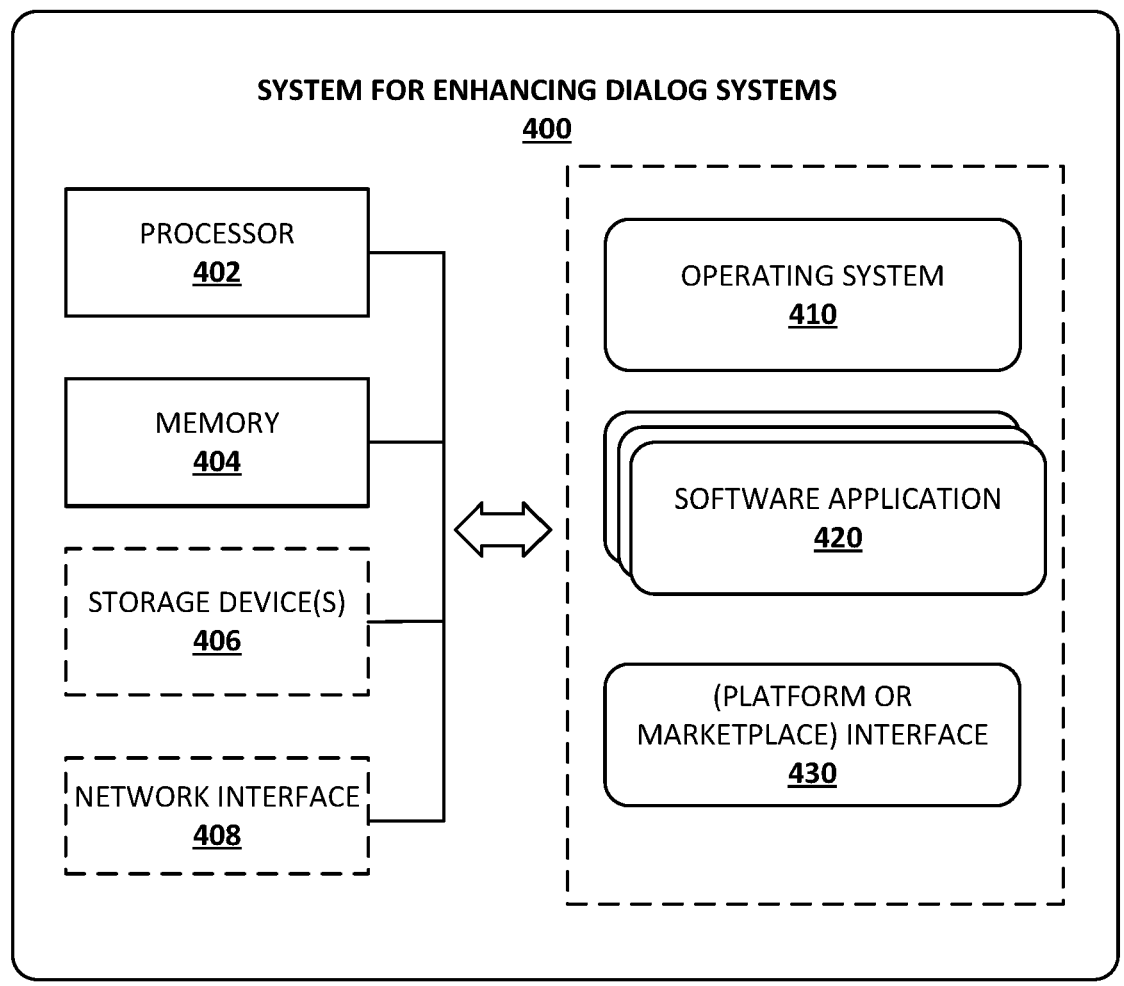
FIG. 4 is a block diagram of a system for enhancing dialog systems, in accordance with example embodiments.

FIG. 4 is a high-level block diagram illustrating an example system 400 for enhancing dialog systems described herein. In particular, the system 400 may be a server-based solution suitable for running a platform 110 and/or a marketplace 170 shown on FIG. 1.

Note that all components of the system 400 shown on FIG. 4 may include logic elements, hardware components, software (firmware) components, virtual components, or a combination thereof. The system 400 may include, relate, or constitute an integral part of one or more of a variety of types of devices and systems such as a general-purpose computer, server, web server, network service, cloud-computing service, and so forth. Further, all modules shown in FIG. 4 may be operatively coupled using any suitable wired, wireless, radio, electrical, or optical standards.

As shown in FIG. 4, the system 400 includes the following hardware components: at least one processor 402, a memory 404, optionally one or more storage devices 406, and optionally network interface 408. The system 400 may also optionally include the following software or virtual components: an operating system 410, one or more software applications 420, and an interface 430 (such as a platform interface 112 and/or marketplace interface 174 shown on FIG. 1). The interface 430 may provide a human-centric interface for accessing and managing information as discussed herein.

In some embodiments, the processor 402 may be configured to implement functionality and/or process instructions for execution within the system 400. For example, the processor 402 may process instructions stored in the memory 404 and/or instructions stored on the storage devices 406. Such instructions may include components of the operating system 410, the software applications 420, and/or the interface 430.

The memory 404, according to one example embodiment, may be configured to store information within system 400 during operation. The memory 404, in some example embodiments, may refer to a non-transitory computer-readable storage medium or a computer-readable storage device. In some example embodiments, the memory 404 may be a temporary memory, meaning that a primary purpose of the memory 404 may not be long-term storage. The memory 404 may also refer to a volatile memory, meaning that the memory 404 may not maintain stored contents when the memory 404 is not receiving power. Examples of volatile memories include random access memories (RAM), dynamic random access memories (DRAM), static random access memories (SRAM), and other forms of volatile memories known in the art. In some examples, the memory 404 may be used to store program instructions for execution by the processor 402. The memory 404, in one example embodiment, may be used to temporarily store information during program execution.

One or more storage devices 406 can also include one or more transitory or non-transitory computer-readable storage media and/or computer-readable storage devices. In some embodiments, the storage devices 406 may be configured to store greater amounts of information than the memory 404. The storage devices 406 may further be configured for long-term storage of information. In some examples, the storage devices 406 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art. In one example, the storage devices 406 can include a database shown as a database 172 on FIG. 1 (i.e., the storage devices 406 can store and maintain multiple dialog system extension elements, which include plugins, add-ons, extensions, etc.). In other embodiments, the storage devices 406 can store and maintain user profiles and custom Dialog System Engines.

Still referencing to FIG. 4, the system 400 may include a network interface 408. The network interface 408 can be utilized to communicate with external devices, servers, and networked systems via one or more communications networks such as one or more wired, wireless, or optical networks including, for example, the Internet, intranet, LAN, WAN, cellular phone networks (e.g. Global System for Mobile (GSM) communications network, packet switching communications network, circuit switching communications network), Bluetooth radio, and an IEEE 802.11-based radio frequency network, among others. The network interface 408 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus.

The operating system 410 may control one or more functionalities of system 400 or components of the system 400. For example, the operating system 410 may interact with the interface 430, and may further facilitate one or more interactions between the software applications 420 and processor 402, memory 404, storage devices 406, and/or network interface 408. The operating system 410 may interact with or be otherwise coupled to the interface 430 and components of the interface 430. Notably, the system 400 and its components may also interact with one or more remote storage or computing resources including, for example, web resources, web sites, social networking websites, blogging websites, news feeds, email servers, web calendars, event databases, ticket aggregators, map databases, points of interest databases, and so forth. Software applications 420, in essence, may provide functionality to the platform and/or the marketplace and enable their operation. Alternatively, the software applications 420 may be additions to the platform and/or the marketplace.

Figure 5:
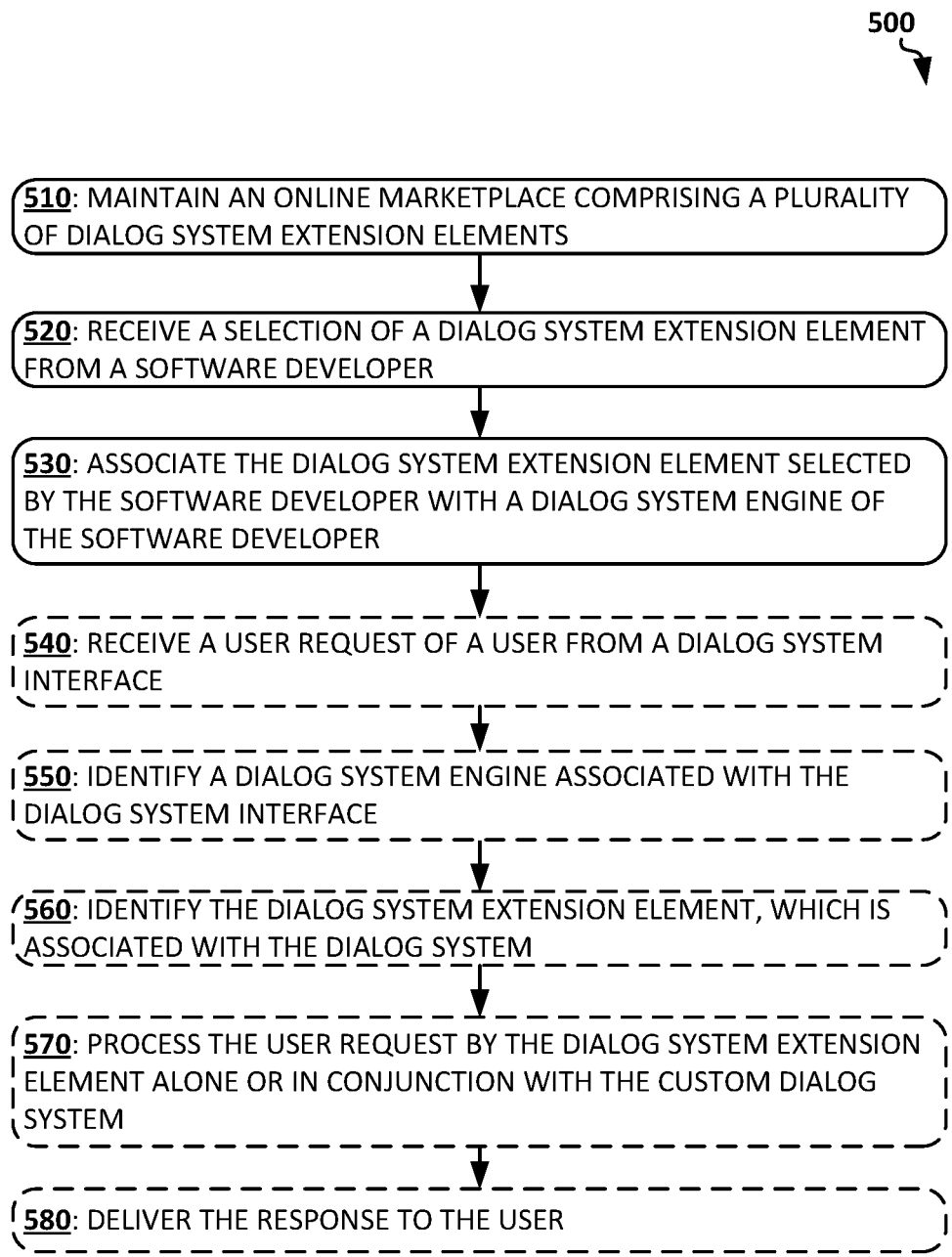
FIG. 5 is a flow chart illustrating a method for enhancing dialog systems, in accordance with example embodiments.

FIG. 5 is a process flow diagram showing a method 500 for enhancing dialog systems, according to an example embodiment. The method 500 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the marketplace 170 and/or the platform 110 shown on FIG. 1. Notably, the below recited steps of the method 500 may be implemented in an order different than described and shown in FIG. 5. Moreover, the method 500 may have additional steps not shown herein, but which can be evident for those skilled in the art from the present disclosure. The method 500 may also have fewer steps than outlined below and shown in FIG. 5.

The method 500 may commence at operation 510 with maintaining an online marketplace. The online marketplace may be maintained by the memory and may include a plurality of dialog system extension elements (e.g., a dialog system plugin, a dialog system add-on, a dialog system update, and a dialog system upgrade). A software developer may view and select particular dialog system extension elements through a marketplace interface. In an example embodiment, the software developer can review metadata associated with dialog system extension elements, review comments of other developers or users, ranks, ratings, reviews, publisher's information, description, manuals, images, videos, legal information, and so forth.

At operation 520, a processor may receive at least one selection of a dialog system extension element from the software developer. In an example embodiment, the software developer is associated with a dialog system; i.e., the software developer may have the dialog system developed or it my be owned by the software developer.

In some embodiments, the selection may require making a financial transaction so that the dialog system extension element can be integrated with a particular Dialog System Engine. In these cases, the software developer may need to make a subscription to a plan or make a lump sum payment for the right to use the selected dialog system extension element. More specifically, upon receiving the selection of the dialog system extension element, the processor may receive a selection of a subscription plan for the dialog system extension element from the software developer. Furthermore, the processor may receive a payment for the dialog system extension element. The payment may be provided by the software developer in accordance with the subscription plan.

At operation 530, the processor may associate the dialog system extension element selected by the software developer with the dialog system of the software developer. For this purpose, the processor may need to identify the software developer or the dialog system associated with the software developer. The identification can be accomplished by an authorization process (i.e., requesting the software developer to login with the online marketplace). More specifically, the processor may receive an authorization request from the software developer.

In this regard, the processor may communicate with the platform based on the authorization data and access the records or user profile associated with the software developer and the dialog system of the software developer. The records may be stored in the memory. Based on the records, the software developer and the dialog system of the software developer may be identified. Once the software developer and/or the dialog system of the software developer are identified, the processor may authorize an access of the software developer to the online marketplace. The processor may further proceed to linking the dialog system of the software developer with the dialog system extension element selected by the software developer. For the linking, the dialog system extension element may be integrated or embedded into the dialog system of the software developer, or, alternatively, certain links or metadata associated with the dialog system extension element may be integrated with the dialog system of the software developer. In either case, the dialog system extension element may operate in conjunction with the dialog system of the software developer.

In an example embodiment, the software developer can obtain dialog system extension elements as "black box" solutions, meaning the software developer may be not able to see source code, entities, intents, or other information of the dialog system extension element. Alternatively, the software developer can obtain dialog system extension elements as "white box" solutions, meaning the software developer may be able to see source codes, entities, intents, or other information of the dialog system extension element. In yet more embodiments, various options in between "black box" and "white box" solutions can be provided, meaning there can be provided various access levels which can allow the software developer to view and edit particular elements of the dialog system extension elements (e.g., access to intent execution results, but not dialogs definitions, intents and entities themselves). Alternatively, the software developer can be provided with a full open-source access to the dialog system extension element. In other words, the dialog system extension elements may be provided as open-source dialog system extension elements editable by the software developer, restricted access dialog system extension elements partly editable by the software developer, and closed access dialog system extension elements non-editable by the software developer.

Further, when the dialog system extension element is successfully associated with the dialog system, the operation of the dialog system can be as follows. At operation 540, the processor may receive a user request from a dialog system interface. The dialog system interface may be installed on a user device or a third party server. The dialog system interface may be associated with the dialog system maintained at the online platform. At operation 550, the processor may identify a dialog system engine associated with the dialog system interface and, thus, with the dialog system. At operation 560, the processor, or the dialog system engine, may identify the dialog system extension element or multiple elements associated with the dialog system engine. Optionally, an arbitration step can be performed to select between elements or present the user with multiple results at once. The arbitration step can be performed by an arbitration application. At operation 570, the user request may be processed by the dialog system extension element alone or in conjunction with the dialog system engine to generate a response to the user request. Finally, at operation 580, the processor may cause the delivery of the response to the user. The delivery of the response may include delivering, to the dialog system interface or to a user device, text, video, audio, and/or metadata, such as a callback URL where the user device can obtain data for delivering to the user.

In certain embodiments, at operation 570, the dialog system engine may attempt to process the user request without any dialog system extension elements. Such processing may include activating the dialog system based on the user request, retrieving one or more entities and one or more intents as discussed above, and processing the user request by applying one or more entities and one or more intents in order to generate a proper response or fulfillment action. If the processing of the user request in such a way was successful, the processor may proceed to operation 580 so as to deliver the response to the user or make a particular action. Alternatively, if the processing of the user request by applying the dialog system engine itself is unsuccessful, the user request is processed by the dialog system extension element (or multiple dialog system extension elements) so as to generate a substitute response to the user request. Once the substitute response is generated by one or more dialog system extension elements, the method 500 proceeds to operation 580 as discussed above.

Figure 6:
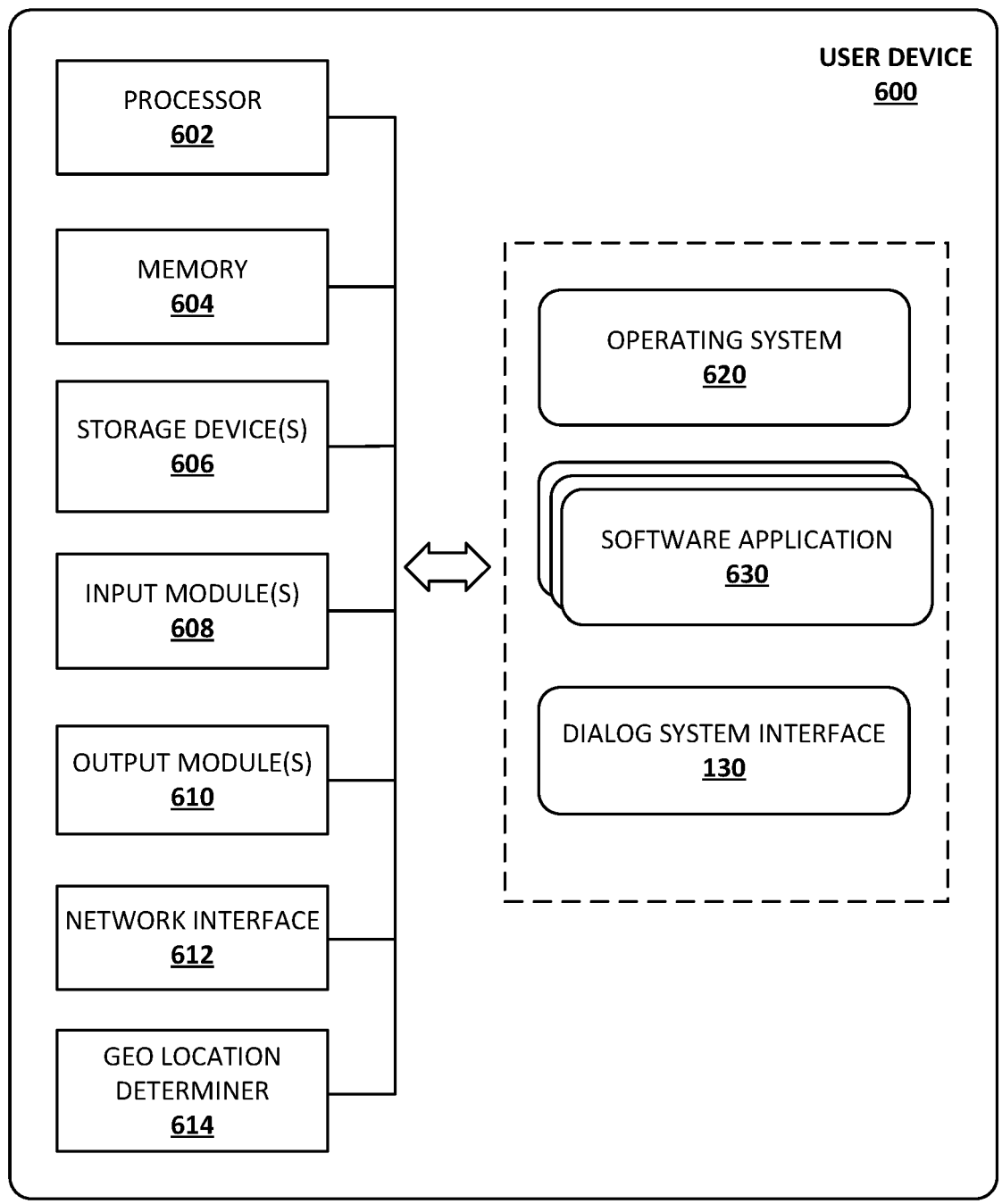
FIG. 6 is a high-level block diagram illustrating an example user device suitable for implementing the methods described herein.

FIG. 6 is a high-level block diagram illustrating an example user device 600 suitable for implementing the methods described herein. It is worth mentioning that all components of the user device 600 may include logic elements, hardware components, software (firmware) components, virtual components, or a combination thereof.

The user device 600 may include at least an integral part of one or more of a variety of types of devices and systems such as a general-purpose computer, desktop computer, server, computer network, network service, cloud-computing service, and so forth. Further, all modules shown in FIG. 6 may be operatively coupled using any suitable wired, wireless, radio, electrical, or optical standards. As already outlined above, the user device 600 may refer to a smart phone, wireless telephone, computer, such as a tablet computer or desktop computer, infotainment system, in-vehicle computing device, and the like.

As shown in FIG. 6, the user device 600 may include the following hardware components: at least one processor 602, a memory 604, one or more storage devices 606, one or more input modules 608, one or more output modules 610, a network interface 612, and a geo location determiner 614. The user device 600 may also include the following software or virtual components: an operating system 620, one or more software (mobile) applications 630, and a dialog system interface 130, which can be a stand-alone software application or be integrated into one or more software applications 630. The dialog system interface 130 may provide a human-centric interface for accessing and managing information as discussed herein, communicating with a dialog system engine, and communicating with web resources/web services. According to various embodiments, the dialog system interface 130 can be virtual.

The processor 602 may be configured to implement functionality and/or process instructions for execution within the user device 600. For example, the processor 602 may process instructions stored in the memory 604 and/or instructions stored on the storage devices 606. Such instructions may include components of the operating system 620 and the software applications 630. The user device 600 may also include one or more additional components not shown in FIG. 6, such as a housing, power supply, communication bus, and the like. These elements are omitted so as to not burden the description of present embodiments.

The memory 604, according to one example embodiment, may be configured to store information within the user device 600 during operation. The memory 604 may refer to a non-transitory computer-readable storage medium or a computer-readable storage device. In some examples, the memory 604 may be a temporary memory, meaning that a primary purpose of the memory 604 may not be long-term storage. The memory 604 may also refer to a volatile memory, meaning that the memory 604 may not maintain stored contents when the memory 604 is not receiving power. Examples of volatile memories include RAM, DRAM, SRAM, and other forms of volatile memories known in the art. In some examples, the memory 604 may be used to store program instructions for execution by the processor 602. The memory 604, in one example embodiment, may be used by software (e.g., the operating system 620) or the dialog system interface 130 executing on the user device 600 to temporarily store information during program execution. The storage devices 606 can also include one or more transitory or non-transitory computer-readable storage media and/or computer-readable storage devices. In some embodiments, the storage devices 606 may be configured to store greater amounts of information than the memory 604. The storage devices 606 may further be configured for long-term storage of information. In some examples, the storage devices 606 may include non-volatile storage elements. Examples of such non-volatile storage elements include magnetic hard discs, optical discs, solid-state discs, flash memories, forms of EPROM or EEPROM, and other forms of non-volatile memories known in the art.

Still referencing to FIG. 6, the user device 600 may include one or more input modules 608. The input modules 608 may be configured to receive user inputs. Examples of the input modules 608 may include a microphone, keyboard, keypad, mouse, trackball, touchscreen, touchpad, or any other device capable of detecting an input from a user or other source in the form of speech, audio, or tactile actions, and relaying the input to the user device 600 or components thereof.

The output modules 610, in some example embodiments, may be configured to provide output to users through visual or auditory channels. The output modules 610 may include a video graphics adapter card, liquid crystal display monitor, light emitting diode monitor, sound card, speaker, or any other device capable of generating output that may be intelligible to a user.

The user device 600, in some embodiments, may include the network interface 612. The network interface 612 can be utilized to communicate with external devices, servers, and networked systems via one or more communications networks such as one or more wired, wireless, or optical networks including, for example, the Internet, intranet, LAN, WAN, cellular phone networks (e.g., GSM communications network, packet switching communications network, circuit switching communications network), Bluetooth radio, and an IEEE 802.11-based radio frequency network, among others. The network interface 612 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus.

The user device 600 may further include the geo location determiner 614 for determining a current geographical location of the user device. The geo location determiner 614 may utilize a number of different methods for determining geographical location including, for example, receiving and processing signals of Global Positioning Systems, GLONASS satellite navigation systems, or the Galileo satellite navigation system; utilizing multilateration of radio signals between radio towers (base stations); or utilizing geolocation methods associated with Internet Protocol addresses, Media Access Control addresses, Radio-Frequency Identification, or other technologies.

The operating system 620 may control one or more functionalities of the user device 600 or its components. For example, the operating system 620 may interact with the dialog system interface 130 and may further facilitate one or more interactions between the software applications 630 and one or more of the processor 602, the memory 604, the storage devices 606, the input modules 608, and the output modules 610. As shown in FIG. 6, the operating system 620 may interact with or be otherwise coupled to the software applications 630, the dialog system interface 130, and components thereof. In some embodiments, the dialog system interface 130 can be included into the operating system 620 and/or the software applications 630. Notably, the user device 600 and its components, such as the dialog system interface 130, may also interact with one or more remote storage or computing resources including, for example, web resources, websites, social networking websites, blogging websites, news feeds, email servers, web calendars, event databases, ticket aggregators, map databases, points of interest databases, and so forth.

Thus, methods and systems for enhancing dialog systems have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for enhancing dialog systems, comprising:
a memory operable to maintain an online marketplace comprising a plurality of dialog system extension elements, wherein each of the plurality of dialog system extension elements includes at least one of a dialog system plugin, a dialog system add-on, a dialog system update, and a dialog system upgrade; and
at least one processor operable to:
receive a selection of one of the plurality of dialog system extension elements from a software developer, the software developer being associated with and managing a dialog system engine of a dialog system;
based on the selection, associate the one of the plurality of dialog system extension elements with the dialog system engine associated with the software developer, wherein associating the one of the plurality of dialog system extension elements with the dialog system engine modifies at least a portion of functionality of the dialog system;
subsequent to associating the one of the plurality of dialog system extension elements with the dialog system engine:
receive a user request of a user via a dialog system interface of the dialog system, wherein the user request corresponds to voice input provided by the user, and wherein the dialog system interface is installed on a user device;
identify, based on the user request, the dialog system engine that is associated with the software developer; and
based on identifying the dialog system engine that is associated with the software developer:
process the user request by the one of the plurality of dialog system extension elements associated with the dialog system engine to generate a response to the user request, wherein the response to the user request includes at least one of: text to be delivered to the user or metadata including instructions to perform one or more actions, and
cause delivery of the response, by the dialog system interface and at the user device of the user, for visual or audio presentation to the user.

2. The system of claim 1, wherein the at least one processor is further operable to:
receive an authorization request from the software developer, the authorization request including at least authorization data associated with the software developer;
based on the authorization data, access records associated with the software developer and the dialog system of the software developer, the records being stored in the memory;
based on the records, identify the software developer and the dialog system of the software developer; and
based on the identifying, authorize an access of the software developer to the online marketplace.

3. The system of claim 1, wherein the associating of the one of the plurality of dialog system extension elements with the dialog system engine includes embedding the one of the plurality of dialog system extension elements into the dialog system.

4. The system of claim 1, wherein each of the plurality of dialog system extension elements is associated with additional metadata, the metadata being provided for a review to the software developer.

5. The system of claim 1, wherein the dialog system engine associated with the software developer is further associated with multiple others of the plurality of dialog system extension elements and wherein processing the user request by the one of the plurality of dialog system extension elements associated with the dialog system further comprises:

performing arbitration, by the dialog system engine associated with the software developer, to select the one of the plurality of dialog system extension elements associated with the dialog system engine to use in processing the user request.

6. The system of claim 1, wherein the dialog system engine is associated with one or more other dialog system interfaces installed on the user device of the user.

7. The system of claim 1, wherein the one of the plurality of dialog system extension elements is at least partially non-editable by the software developer.

8. A computer-implemented method for enhancing dialog systems, the method being performed by one or more processors and a memory, the method comprising:

maintaining, by the memory, an online marketplace comprising a plurality of dialog system extension elements, wherein each of the plurality of dialog system extension elements includes at least one of a dialog system plugin, a dialog system add-on, a dialog system update, and a dialog system upgrade;

receiving, by one or more of the processors, data indicating one of the plurality of dialog system extension elements selected by a software developer, the software developer being associated with and managing a dialog system engine of a dialog system;

based on receiving the data indicating the one of the plurality of dialog system extension elements selected by the software developer, associating, by one or more of the processors, the one of the plurality of dialog system extension elements with the dialog system engine associated with the software developer, wherein associating the one of the plurality of dialog system extension elements with the dialog system engine modifies at least a portion of functionality of the dialog system;

subsequent to associating the one of the plurality of dialog system extension elements with the dialog system engine:

receiving a user request of a user via a dialog system interface of the dialog system, wherein the user request corresponds to voice input provided by the user, and wherein the dialog system interface is installed on a user device;

identifying based on the user request, the dialog system engine that is associated with the software developer; and based on identifying the dialog system engine that is associated with the software developer:

processing the user request by the one of the plurality of dialog system extension elements associated with the dialog system engine to generate a response to the user request, wherein the response to the user request includes at least one of: text to be delivered to the user or metadata including instructions to perform one or more actions, and causing delivery of the response, by the dialog system interface and at the user device of the user, for visual or audio presentation to the user.

9. The method of claim 8, further comprising:

receiving an authorization request from the software developer, the authorization request including at least authorization data associated with the software developer;

based on the authorization data, accessing records associated with the software developer and the dialog system of the software developer, the records being stored in the memory;

based on the records, identifying the software developer and the dialog system of the software developer; and based on the identifying, authorizing an access of the software developer to the online marketplace.

10. The method of claim 8, wherein the associating of the one of the plurality of dialog system extension elements with the dialog system engine includes embedding the one of the plurality of dialog system extension elements into the dialog system.

11. The method of claim 8, wherein each of the plurality of dialog system extension elements is associated with additional metadata, the metadata being provided for a review to the software developer.

12. The method of claim 8, wherein the dialog system engine associated with the software developer is further associated with multiple others of the plurality of dialog system extension elements and wherein processing the user request by the one of the plurality of dialog system extension elements associated with the dialog system further comprises:

performing arbitration, by the dialog system engine associated with the software developer, to select the one of the plurality of dialog system extension elements associated with the dialog system engine to use in processing the user request.

13. The method of claim 8, wherein the dialog system engine is associated with one or more other dialog system interfaces installed on the user device of the user.

14. The method of claim 8, wherein the one of the plurality of dialog system extension elements is at least partially non-editable by the software developer.

15. A non-transitory machine-readable medium having instructions stored thereon, which when executed by one or more processors, cause the one or more processors to implement a method for enhancing dialog systems, the method comprising:

maintaining an online marketplace comprising a plurality of dialog system extension elements, wherein each of the plurality of dialog system extension elements includes at least one of a dialog system plugin, a dialog system add-on, a dialog system update, and a dialog system upgrade;

receiving data indicating one of the plurality of dialog system extension elements selected by a software developer, the software developer being associated with and managing a dialog system engine of a dialog system;

based on receiving the data indicating the one of the plurality of dialog system extension elements selected by the software developer, associating the one of the plurality of dialog system extension elements with the dialog system engine associated with the software developer, wherein associating the one of the plurality of dialog system extension elements with the dialog system engine modifies at least a portion of functionality of the dialog system;

subsequent to associating the one of the plurality of dialog system extension elements with the dialog system engine:

receiving a user request of a user via a dialog system interface of the dialog system, wherein the user request corresponds to voice input provided by the user, and wherein the dialog system interface is installed on a user device;

identifying, based on the user request, the dialog system engine that is associated with the software developer; and based on identifying the dialog system engine that is associated with the software developer:

processing the user request by the one of the plurality of dialog system extension elements associated with the dialog system engine to generate a response to the user request, wherein the response to the user request includes at least one of: text to be delivered to the user or metadata including instructions to perform one or more actions, and causing delivery of the response, by the dialog system interface and at the user device of the user, for visual or audio presentation to the user.

16. The non-transitory machine-readable medium of claim 15, wherein the associating of the one of the plurality of dialog system extension elements with the dialog system engine includes embedding the one of the plurality of dialog system extension elements into the dialog system.

17. The non-transitory machine-readable medium of claim 15, wherein each of the plurality of dialog system extension elements is associated with additional metadata, the metadata being provided for a review to the software developer.

18. The non-transitory machine-readable medium of claim 15, wherein the dialog system engine associated with the software developer is further associated with multiple others of the plurality of dialog system extension elements and wherein processing the user request by the one of the plurality of dialog system extension elements associated with the dialog system further comprises:

performing arbitration, by the dialog system engine associated with the software developer, to select the one of the plurality of dialog system extension elements associated with the dialog system engine to use in processing the user request.

19. The non-transitory machine-readable medium of claim 15, wherein the dialog system engine is associated with one or more other dialog system interfaces installed on the user device of the user.

20. The non-transitory machine-readable medium of claim 15, wherein the one of the plurality of dialog system extension elements is at least partially non-editable by the software developer.

\* \* \* \* \*